Patented July 5, 1949

2,474,807

UNITED STATES PATENT OFFICE 2,474,807

MANUFACTURE OF SYNTHETIC RUBBER

Dwight L. Schoene, Naugatuck, Conn., assignor to United States Rubber Company, New York, N. Y., a corporation of New Jersey No Drawing. Application December 4, 1946, Serial No. 713,907

8 Claims. (Cl. 260—80.7)

This invention relates to improvements in the manufacture of synthetic rubber, and particularly to improvements in the physical properties and processing characteristics of polymerizates of butadienes-1,3 and of mixtures of butadienes-1,3 with compounds which are copolymerizable.

It is known that in the manufacture of products from synthetic rubbers, such as commercial GR-S rubber which is a copolymer of butadiene-1,3 and styrene, considerable shrinkage takes place during milling, breaking down, and compounding the raw material prior to vulcanization and during vulcanization. This shrinkage introduces difficulties into the accurate measurement of freshly milled stocks, causes excessive surface roughness or rugosity in calendered compounds as well as irregular and broken edges, and gives rise to variations in thickness when the compound is extruded.

According to the present invention, there is added to the polymerizable materials in the preparation of synthetic rubber, prior to final polymerization, a small amount of a divinyl benzene, napthalene or diphenyl or a di-(α-methyl) vinyl or di-(α-ethyl) vinyl homologue thereof. These compounds conform to the general formula:

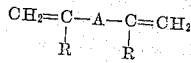

where A may be an aryl nucleus such as phenylene, naphthylene, or diphenylene, and R may be hydrogen, a methyl group, or an ethyl group. Examples of such compounds are o-divinyl benzene, m-divinyl benzene, p-divinyl benzene, 1,2-divinyl naphthalene, 1,4-divinyl naphthalene, 1,8-divinyl naphthalene, o-di-isopropenyl benzene, p-di-(α-ethyl vinyl) benzene, 4,4'-divinyl diphenyl. The preferred compound is technical divinyl benzene, but any of the above compounds, singly or in combination, may be used within the range stated herein.

The compound having the above general formula is mixed in small quantities with the synthetic rubber ingredients prior to the final stage of polymerization, and polymerization is carried out in the customary manner according to known practice, at least part of the polymerization being performed in the presence of a small quantity of the compound. The compound, for example, divinyl benzene, may be added to the synthetic rubber ingredients at the initial stage of mixture of the monomers in amounts between 0.01 and .5 parts by weight based on 100 parts of total synthetic rubber content, as exemplified below, or they may be added to a synthetic rubber compound prior to complete or final polymerization at a later stage in the polymerization process so that further polymerization has the effect of interpolymerizing or chemically combining the divinyl benzene with the other synthetic rubber constituent or constituents.

Synthetic rubber latex such as an aqueous emulsion of butadiene-1,3 with styrene (GR-S latex) normally exhibits considerable shrinkage after coagulation and during drying and vulcanization. This property is particularly undesirable in the manufacture of sponge rubber from a foam of synthetic latex. It is known that maturing such rubber latex with sulfur, as by letting the latex stand for 30 hours with 1% by weight of sulfur based on the rubber solids content has the effect of reducing the shrinkage of the wet sponge after the rubber sponge has gelled, but the required long periods of time have certain practical disadvantages. The present invention eliminates the necessity for long maturing periods and the polymerizable compounds such as divinyl benzene may be conveniently incorporated in the latex prior to final emulsion polymerization of the rubber-forming monomers. Quantities of divinyl benzene substantially in excess of .5% based on the rubber polymer content, have the desired effect of maintaining surface smoothness and reducing shrinkage, but, surprisingly, as shown in the examples below, the tensile strength is so greatly reduced as to render the resulting compound virtually worthless for use as a rubber substitute.

The present invention may be performed by any of the usual known techniques of polymerization, such as by the polymerization of a peroxide initiated aqueous emulsion of monomeric materials or mixtures, or by mass or solution polymerization thereof initiated by metallic sodium, sodium hydride or organo sodium compounds, thereby yielding a polymer in which the monomers are believed to form a net-work or gel-like structure of polymer chains.

Examples of synthetic rubber-producing polymerizable materials which are improved by the present invention are the butadienes-1,3 such as butadiene-1,3, 2-methyl-butadiene-1,3 (isoprene), 2,3-dimethyl-butadiene-1,3, piperylene, 2-chloro-butadiene-1,3 (chloroprene) and mixtures thereof and mixtures of such butadienes-1,3 with other polymerizable compounds which are capable of forming rubbery copolymers with butadienes-1,3, for example, up to 70% by weight of such mixture of compounds which have a single C=C double linkage, for example, esters of maleic and fumaric acids, or compounds which contain a single

group where at least one of the disconnected valences is attached to an electro-active group, i. e., to a group which substantially increases the electrical dissymetry or polar character of the molecule. Examples of compounds which contain a single

group and are copolymerizable with butadienes-1,3 are the aryl olefines, such as styrene, vinyl naphthalene, o-, m-, or p-monochlorostyrene; the alpha methylene carboxylic acids and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinyl-idene chloride; vinyl thiazole, vinyl pyridine. Present day commercial synthetic rubbers of the above types are copolymers of butadiene-1,3 and styrene known as Buna S or GR-S rubber; copolymers of butadiene-1,3 and acrylonitrile are known as Buna N or GR-N rubber; and polymers of 2-chloro-butadiene-1,3 (chloroprene) are known as neoprene rubber.

The following examples illustrate the invention and its advantages.

EXAMPLE I

Test samples of GR-S synthetic rubber containing varying amounts of divinyl benzene were made up according to the formulations listed in the table below, the figures representing parts by weight. Each sample was separately prepared and then polymerized by heating in a closed reactor for 14 to 16 hours at 50° C. The reaction was stopped by the addition of 0.1 part of hydroquinone and the unreacted monomers were removed in conventional manner, by venting off the butadiene-1,3 and steam-distilling the styrene. The percentage of conversion of the monomers to polymers is also indicated in the table, and it will be noted that test sample F is a standard GR-S rubber containing no divinyl benzene.

| Ingredients | Test Sample | | | | | |
|---|---|---|---|---|---|---|
| | A | B | C | D | E | F¹ |
| Butadiene-1, 3 | 72 | 72 | 72 | 72 | 72 | 72 |
| Styrene | 27.94 | 27.91 | 27.8 | 27.5 | 27 | 28 |
| Divinyl benzene | 0.06 | 0.09 | 0.2 | 0.5 | 1 | 0 |
| Dodecyl mercaptan | 0.6 | 0.6 | 0.6 | 0.6 | 0.6 | 0.6 |
| Potassium persulfate | 0.3 | 0.3 | 0.3 | 0.3 | 0.3 | 0.3 |
| Soap | 5.0 | 5.0 | 5.0 | 5.0 | 5.0 | 5.0 |
| Water | 180 | 180 | 180 | 180 | 180 | 180 |
| Percent Conversion | 77 | 78 | 77 | 78 | 78 | 77 |

¹ Standard.

The dodecyl mercaptan is a conventional polymerization regulator and the potassium persulfate is a conventional catalyst. The emulsions thus produced in latex form were then treated separately by addition of a commercial ketone-diarylamine antioxidant and then were flocculated with salt-acid and dried at 55° C. The finished polymer samples were then compounded according to the following formulae, after which portions of each of the test sample compounds were subjected to vulcanization for different periods of time, i. e. 30, 60, and 90 minutes. Parts are listed by weight.

| Compounding Ingredients | Test Sample | | | | | |
|---|---|---|---|---|---|---|
| | A | B | C | D | E | F |
| GR-S rubber | 100 | 100 | 100 | 100 | 100 | 100 |
| Channel black | 50 | 50 | 50 | 50 | 50 | 50 |
| Zinc oxide | 5 | 5 | 5 | 5 | 5 | 5 |
| Coal tar softener | 5 | 5 | 5 | 5 | 5 | 5 |
| Sulfur | 2 | 1.25 | 1.25 | 1.25 | 1.25 | 2 |
| Mercaptobenzothiazole | 1.5 | 1.5 | 1.5 | 1.5 | 1.5 | 1.5 |

The compounded test samples were subjected to a series of comparative physical tests. Sample F is the standard GR-S material containing no divinyl benzene and samples A to E containing varying amounts of divinyl benzene were compared therewith.

*Calender shrinkage test*

Samples of the materials A to F were tested for calender shrinkage as described in an article by White et al. published in "Industrial and Engineering Chemistry," vol. 37, (1945) page 767. Dimensionally identical strips of each of the samples were calendered under identical temperature conditions from stocks A to F and their length was measured as they left the calender nip. The samples were then allowed to cool and shrink freely for 8 hours, after which the length was again measured for each sample. The figures expressed below represent the original length less the length after shrinkage, divided by the original length: in other words, the percentage of shrinkage.

| Sample | A | B | C | D | E | F |
|---|---|---|---|---|---|---|
| Per Cent Shrinkage | 30 | 21 | 20 | 5 | 5 | 43 |

Reference to the composition of the various samples shows that as the divinyl benzene content is raised gradually to 1 percent the calender shrinkage is reduced. Samples D and E, containing respectively 0.5% and 1.0% of divinyl benzene, both exhibited only 5% calender shrinkage as compared with sample F which shrank 43%. Samples A, B, and C all shrank considerably less than sample F.

*Rugosity test*

The surface roughness or rugosity of calendered sheets of samples A to F was measured in the manner described by Mooney in "Industrial and Engineering Chemistry (Analytical Edition)," vol. 17, (1945) page 514. The lower the rugosity value, the smoother is the calendered stock. Optimum rugosity figure is exhibited by sample D (containing 0.5% divinyl benzene), and all the samples A to E were smoother than sample F.

| Sample | A | B | C | D | E | F |
|---|---|---|---|---|---|---|
| Rugosity value | .13 | .15 | .09 | .02 | .08 | .21 |

*Tubing swell test*

Samples of each of the stocks A to F were extruded through a triangular die in a tubing machine as described by Nellen in "Industrial and Engineering Chemistry," vol. 29, (1937) page 886, and the samples were permitted to stand for about 5 hours. At the end of the standing period, the cross-sectional area of each sample was measured and compared with the cross-sectional area of the sample when first extruded. The percent swell of each extruded sample is indicated in the following table which represents the percentage increase in cross-sectional area after the standing period over the cross-sectional area at the point of extrusion. Again the results with samples A to E were superior in cross-sectional shrinkage to sample F; sample D exhibiting the optimum.

| Sample | A | B | C | D | E | F |
|---|---|---|---|---|---|---|
| Per cent swell | 33 | 26 | 26 | 4 | 5 | 49 |

Two series of tests were run on samples A to F to determine their tensile strength: one on unaged stock, the other on stock which was aged for 96 hours at 100° C. prior to vulcanization. The vulcanization or curing time is stated for each measurement, as shown below, and curing was at 45 lb. steam pressure.

*Tensile strength test*

The following figures represent the pounds per square inch which were applied when the various samples were stretched to the breaking point. Samples of each of the compounds A to F were cured for the periods indicated, and comparative results with both unaged and aged samples are shown:

| Curing time | Pounds per Sq. Inch—Unaged Stock Samples ||||||
|---|---|---|---|---|---|---|
| | A | B | C | D | E | F |
| 30 minutes | 1,980 | 2,000 | 1,500 | 600 | 250 | 1,800 |
| 60 minutes | 2,610 | 2,600 | 2,240 | 960 |  | 2,920 |
| 90 minutes | 2,450 | 2,590 | 2,180 | 1,150 |  | 2,800 |

| Curing time | Pounds per Sq. Inch—Aged Stock Samples ||||||
|---|---|---|---|---|---|---|
| | A | B | C | D | E | F |
| 30 minutes | 2,550 | 1,850 | 2,200 | 1,350 |  | 1,810 |
| 60 minutes | 2,210 | 2,250 | 2,250 | 1,350 |  | 2,150 |
| 90 minutes | 2,400 | 2,370 | 2,200 | 1,400 |  | 2,430 |

The blank figures for sample E (containing 1.0% divinyl benzene) indicate that these samples were too weak to be removed from the curing molds in one piece and hence could not be tested.

*Elongation test*

The following figures represent the percent elongation of the various samples in the preceding test at the breaking point.

| Curing time | Percent Elongation—Unaged Stock Samples ||||||
|---|---|---|---|---|---|---|
| | A | B | C | D | E | F |
| 30 minutes | 620 | 660 | 685 | 395 | 130 | 870 |
| 60 minutes | 540 | 570 | 570 | 390 |  | 725 |
| 90 minutes | 465 | 500 | 525 | 300 |  | 600 |

| Curing time | Percent Elongation—Aged Stock Samples ||||||
|---|---|---|---|---|---|---|
| | A | B | C | D | E | F |
| 30 minutes | 230 | 300 | 345 | 220 |  | 300 |
| 60 minutes | 240 | 265 | 375 | 175 |  | 265 |
| 90 minutes | 280 | 325 | 335 | 210 |  | 325 |

As in the "Tensile strength test" above, all the samples containing 1% divinyl benzene (sample E) were too weak to be removed in one piece from the molds, except the unaged stock which was cured for 30 minutes and which broke after elongation of 130%.

EXAMPLE II

Blends of sample stocks were made up by milling together stocks similar to sample D and sample F of Example I. Sample G was made by blending equal parts of samples D and F. Sample H was the result of blending one part of sample D with three parts of sample F. Sample J was similar to the standard sample F, except that it was milled to an extent equivalent to the milling of the blended samples G and H in order to place the tests on a comparative basis. Various tests were performed as in Example I, and the results are tabulated below. Each sample was compounded with 2.0 parts sulfur and the other compounding ingredients were milled into the stocks as in Example I. In Example II, all stocks were unaged.

| Test Performed | Sample |||
|---|---|---|---|
| | G | H | J [1] |
| Calender shrinkage, percent | 19 | 34 | 43 |
| Rugosity, value | 0.03 | 0.08 | 0.15 |
| Tubing swell, percent | 28 | 41 | 54 |
| Tensile at break, Pounds per Sq. Inch: | | | |
| 30 minute cure | 1,300 | 1,190 | 1,190 |
| 60 minute cure | 2,010 | 2,390 | 2,520 |
| 90 minute cure | 2,050 | 2,410 | 2,790 |
| Elongation at break, Percent: | | | |
| 30 minute cure | 633 | 773 | 873 |
| 60 minute cure | 505 | 626 | 763 |
| 90 minute cure | 450 | 500 | 635 |

[1] Standard.

The results of the tests on the blended samples (sample G containing an aggregate of .25% divinyl benzene based on the polymer weight and sample H containing an aggregate of .125% divinyl benzene) show improved rugosity and reduced calender shrinkage and reduced tubing swell over the standard sample J, while the strength figures for the blends are entirely adequate for commercial use.

In view of the many changes and modifications that may be made without departing from the principles underlying the invention reference should be made to the appended claims for an understanding of the scope of protection afforded the invention.

Having thus described my invention, what I claim and desire to protect by Letters Patent is:

1. Synthetic rubber comprising a polymerizate of a polymerizable mixture of monomers selected from the group consisting of butadiene-1,3, isoprene, 2-chloro-butadiene-1,3, 2,3-dimethyl butadiene-1,3, and piperylene, and mixtures of such butadienes-1,3 with up to 70% by weight of such mixture of material which has a single

group and is copolymerizable with butadienes-1,3, together with .01 to .5 percent by weight of a compound having the general formula

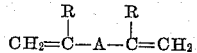

where A represents a member of the group consisting of phenylene, naphthylene and diphenylene and R represents a member of the group consisting of hydrogen, methyl and ethyl.

2. Synthetic rubber comprising a polymerizate of a mixture of a major proportion of butadiene- 1,3 and a minor proportion of a compound which contains a single

group and is copolymerizable with butadiene-1,3 and .01 to .5 percent by weight of a compound having the general formula

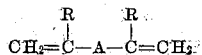

where A represents a member of the group consisting of phenylene, naphthylene and diphenylene and R represents a member of the group consisting of hydrogen, methyl and ethyl.

3. Synthetic rubber comprising a polymerizate of a mixture of a major proportion of butadiene-1,3 and a minor proportion of a compound which contains a single

group and is copolymerizable with butadiene-1,3 and .01 to .5 percent by weight of divinyl benzene.

4. Synthetic rubber comprising a polymerizate of a mixture of a major proportion of butadiene-1,3, and a minor proportion of styrene and .01 to .5 per cent by weight of divinyl benzene.

5. In the process of polymerizing an aqueous emulsion of polymerizable monomers comprising a major proportion of butadiene-1,3 and a minor proportion of a compound which contains a single

group and is copolymerizable with butadiene-1,3, the step which comprises performing at least a part of the polymerization in the presence of .01 to .5 percent based on the weight of polymerizable material of a compound having the general formula

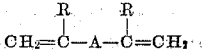

where A represents a member of the group consisting of phenylene, naphthylene and diphenylene and R represents a member of the group consisting of hydrogen, methyl and ethyl.

6. In the process of polymerizing an aqueous emulsion of polymerizable monomers comprising a major proportion of butadiene-1,3 and a minor proportion of a compound which contains a single

group and is copolymerizable with butadiene-1,3, the step which comprises performing at least a part of the polymerization in the presence of .01 to .5 percent based on the weight of polymerizable material of divinyl benzene.

7. In the process of polymerizing an aqueous emulsion of polymerizable monomers selected from the group consisting of butadiene-1,3, isoprene, 2-chloro-butadiene-1,3, 2,3 dimethyl butadiene-1,3, and piperylene, and mixtures of such butadienes-1,3 with up to 70% by weight of such mixture of material which has a single

group and is copolymerizable with butadienes-1,3, the step which comprises performing at least a part of the polymerization in the presence of .01 to .5 percent based on the weight of polymerizable material of a compound having the general formula

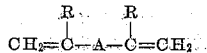

where A represents a member of the group consisting of phenylene, naphthylene and diphenylene and R represents a member of the group consisting of hydrogen, methyl and ethyl.

8. The process of making synthetic rubber which comprises polymerizing a mixture of monomers comprising a major proportion of butadiene-1,3 and a minor proportion of styrene in the presence of .01 to .5 percent of divinyl benzene.

DWIGHT L. SCHOENE.

REFERENCES CITED

The following references are of record in the file of this patent:

UNITED STATES PATENTS

| Number | Name | Date |
| --- | --- | --- |
| 1,901,354 | Meisenburg | Mar. 14, 1933 |
| 1,915,745 | Meisenburg et al. | June 27, 1933 |
| 1,938,731 | Tschunkur et al. | Dec. 12, 1933 |
| 1,938,751 | Meisenburg et al. | Dec. 12, 1933 |
| 2,066,330 | Carothers et al | Jan. 5, 1937 |
| 2,089,444 | Staudinger et al. | Aug. 10, 1937 |
| 2,418,978 | Mertens | Apr. 15, 1947 |

OTHER REFERENCES

Schoene et al., "Development of a better processing GR-S," Ind. Eng. Chem. Ind. Ed., Dec. 1946, pages 1246–1249.

India Rubber World, June 1946, page 365.

India Rubber World, August 1946, page 680.